United States Patent
Verdi et al.

(10) Patent No.: US 7,027,993 B1
(45) Date of Patent: Apr. 11, 2006

(54) COMPUTERIZED KNOWLEDGE BROKERAGE SYSTEM

(75) Inventors: Mark Verdi, Newton, MA (US); Ruth Habbe, Carlisle, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/522,162

(22) Filed: Mar. 9, 2000

Related U.S. Application Data

(60) Provisional application No. 60/124,289, filed on Mar. 12, 1999.

(51) Int. Cl.
*G06F 17/60* (2006.01)

(52) U.S. Cl. .......................................... 705/7
(58) Field of Classification Search ................ 705/7; 345/751, 758; 709/203, 223, 249
See application file for complete search history.

(56) References Cited

U.S. PATENT DOCUMENTS

| | | |
|---|---|---|
| 4,864,497 A | 9/1989 | Lowry et al. |
| 5,404,518 A | 4/1995 | Gilbertson et al. |
| 5,467,471 A | 11/1995 | Bader |
| 5,734,890 A | 3/1998 | Case et al. |
| 5,737,726 A | 4/1998 | Cameron et al. |
| 5,819,267 A | 10/1998 | Uyama |
| 5,822,744 A | 10/1998 | Kesel |
| 5,870,768 A | 2/1999 | Hekmatpour |
| 6,195,091 B1* | 2/2001 | Harple et al. ............... 345/751 |
| 2002/0002482 A1* | 1/2002 | Thomas ....................... 705/10 |

FOREIGN PATENT DOCUMENTS

DE        19750749 A1 *   5/1999

OTHER PUBLICATIONS

Shand, D., Collaborative Catchball, IntraNet, Network World, Inc., Feb. 23, 1998, [GOOGLE].*
Liff, A., Fostering Online Collaboration and Community, Association Management, Washington, vol. 50, issue 9, Sep. 1998, pp. 33-38 [PROQUEST].*
PR Newswire, ConnectedHealth.Net Provider of Internet-Based Knowledge Management Services to Connect the Health Care Industry, PR Newswire Association, Inc., Jan. 28, 1997 [DIALOG: file 16].*
Violino, B., Where CIOs Meet Online, InformationWeek, May 15, 1998 [GOOGLE].*
Huang, Capitalizing on Intellectual Assets, IBM Systems Journal, 1998, p. 570-583 [PROQUEST].*

(Continued)

*Primary Examiner*—Tariq R. Hafiz
*Assistant Examiner*—Michael C. Heck
(74) *Attorney, Agent, or Firm*—JoAnn Kealy Crockatt; Anne Vachon Dougherty

(57) ABSTRACT

This invention relates to a user-driven system, apparatus, and method for generating and sharing knowledge over a computer network. More particularly, this invention relates to a system, apparatus, and method for permitting users of a computer network to procure on-line consulting services.

10 Claims, 2 Drawing Sheets

OTHER PUBLICATIONS

Clayton, Delphi: A technique to harness expert opinion for critical decision-making tasks in education, Educational Psychology, vol. 17, No. 4, Dec. 1997, p. 373-386 [PROQUEST].*

Ackerman et al., "Answer Garden: A Tool for Growing Organizational Memory," *Proceedings of the ACM Conference on Office Information Systems*, pp. 31-39 (Cambridge, Massachusetts, Apr., 1990).

Ackerman, "Expertise Networks as an Enabling Technology for Cyberspace Use," *Invited Paper, Joint White House PARC Conference on Leveraging Cyberspace* (Irvine, California, Oct., 1996).

Ackerman et al., "Answer Garden 2: Merging Organizational Memory with Collaborative Help," *Proceedings of the ACM Conference on Computer-Supported Cooperative Work*, pp. 97-105 (Irvine, California, Nov., 1996).

Kaufman, "Online Consulting Delivers Advice at Firm's Fingertips," *Mercury News* (Silicon Valley, California, May 30, 1998).

McDonald et al., "Just Talk to Me: A Field Study of Expertise Location," *Proceedings of the 1998 ACM Conference on Computer Supported Cooperative Work* (Seattle, Washington, Nov., 1998).

Mainspring Communications, Inc., "Corporate Overview," <http://www.mainspring.com/BaseAll/AboutDoc/1,1045,23,00.html>, pp. 1-2 (downloaded Feb. 17, 1999).

Mainspring Communications, Inc., "Products & Services," <http://www.mainspring.com/BaseAll/AboutDoc/1,1045,21,00.html>, pp. 1-2 (downloaded Feb. 17, 1999).

Crosby, "Industry Snapshot: Business Services," Industry Zone <wysiwyg://13/http://www.hoovers.com/features/industry/business.html>, pp. 1-5 (downloaded Feb. 26, 1999).

The Knowledge Base Knowledge Base, "The Future of Web Knowledge Delivery," <http://www.guidancecom.com/kbase/future.htm>, pp. 1-2 (downloaded Feb. 26, 1999).

Mainspring Communications, Inc., "How We Differ," <http://www.mainspring.com/BaseAll/AboutDoc/1,1045,31,00.html>, pp. 1-3 (downloaded Mar. 3, 1999).

Mainspring Communications, Inc., "Mainspring Success Stories," <http://www.mainspring.com/BaseAll/AboutDoc/1,1045,59,00.html>, pp. 1-3 (downloaded Mar. 3, 1999).

Mainspring Communications, Inc., "Press," <http://www.mainspring.com/BaseAll/AboutDoc/1,1045,2,00.html>, pp. 1-4 (downloaded Mar. 3, 1999).

* cited by examiner

COMPUTERIZED KNOWLEDGE BROKERAGE SYSTEM

RELATED U.S. APPLICATION

This application claims priority to U.S. Provisional Application entitled, "COMPUTERIZED KNOWLEDGE BROKERAGE SYSTEM," Application No. 60/124,289, filed on Mar. 12, 1999, which application is hereby incorporated by reference.

TECHNICAL FIELD

This invention generally relates to a user-driven system, apparatus, and method for generating and sharing knowledge over a computer network. More particularly, this invention relates to a system, apparatus, and method for permitting users of a computer network to procure on-line consulting services.

BACKGROUND

The emergence of the Internet is creating a rapid and profound effect on business today. The digital economy is changing the answers to basic business questions. However, not all companies possess the resources themselves to resolve all of the questions and issues that arise or the ability to do so in so-called "Internet time." Consequently, companies with the time and resources to do so may seek advice from conventional consultant services. If the consultant already has the answer(s) to resolve the company's question(s) or has ready access to other resources that can provide answers, a company's query can be answered reasonably quickly. If not, the consultant can conduct a tailored research project to find solutions or answers for the company. Both options, however, may be expensive. Ready access to resources and maintaining an experienced consultant staff require significant expenditures. Likewise, the cost and time (typically 6–12 months) associated with many research projects are often prohibitive and/or unacceptable to many businesses.

Furthermore, consulting as it is traditionally practiced can cause dissatisfaction among businesses. For example, consultants typically are available for in-person consultations for only brief periods of time (e.g., a week or two); the remainder of their time may be spent traveling and visiting other clients. The original consultant frequently is unavailable to provide further assistance to the clients serviced earlier, even if pressing questions arise. Instead, a less-experienced consultant, or a consultant unfamiliar with the original business, may be assigned to take over. The re-education process for the replacement consultant is costly, both in time and money. In addition, the end product of traditional consultations is typically a lengthy and expensive report. While the report may contain recommendations for the business, the solutions, as discussed above, often are presented well after the time at which the business really needed to solve the problem.

In contrast, presently available on-line consulting systems generally eschew the levels of analysis, research, and reports that are provided with traditional consulting services. Thus, answers are provided faster and at a lower cost. Moreover, the "unavailable" consultant problem is obviated by the fact that on-line consultants are (at least theoretically) available anywhere, at any time.

For small businesses, on-line consulting services provide an opportunity to obtain the advice of an outside consultant at a price that the business can afford and in a time frame that works with the fast pace of the business world. Even for larger companies, on-line consulting can supplement (or even supplant) conventional "mainstream" consultants. Because rapid, iterative decision-making is essential in a competitive global economy, few businesses can afford to take their time seeking and getting strategic advice.

Some presently available on-line consulting services attempt to fill this need using "live" consultants. For example, one known service provides, for a fixed rate, the ability to seek the services of a live consultant for a predetermined number of questions. Users submit questions to the service over a computer network, typically by typing up the question and sending it via electronic mail or a web page. When the question is received by the service, a "knowledge provider" [a live employee] sorts it into a particular subject category so that it can be routed to the appropriate consultant (or other professional qualified to answer the question). Once contacted, the consultant provides an answer directly to the sender of the question.

Other on-line consulting services primarily provide "pre-packaged" information that is targeted to the user's business area. For example, users of one type of system have access to constantly updated information and data relating to various industries, computerized bulletin boards relating to different topics of interest, and a database of the "best practices" of worldwide businesses. The latter service includes features that permit a company to compare its practices with those of its peers and/or other companies in different business areas. Such comparisons generally are viewed as helpful in improving a company's own performance. For a fee, this system will provide a live consultant's services at an hourly rate.

Because presently available on-line consulting services are not research-centric, the accuracy of the consultations provided often depends on the questions asked. For example, with one service, unless a question relates to an area that is already part of a pre-existing database of research, it is unlikely that the on-line consulting service can provide a satisfactory solution. In another example, the on-line consulting service merely provides a consultant to answer questions based on a consultant's own knowledge. More complex questions, such as those requiring custom industry research, are not provided for by any known systems.

SUMMARY OF THE INVENTION

Although on-line consulting is better than traditional consulting at providing answers to specific questions, many businesses would like a "best of both worlds" approach, combining quick responses with, research-oriented, well-analyzed answers to their business concerns. The present invention provides several approaches to meet this need.

In one embodiment, the invention provides a method for networked consulting. A group comprising two or more members is established. Within a predetermined first time period, a first member of the group sends a message over a computer network to a central location. When the message is received at the central location, it is reviewed so that a query based on the message can be defined. This query is then sent from the central location to at least a portion of the group. Within a predetermined second time period, a message is received at the central location in response to the query, the second message comprising a response to the query from a second member of the group. At the central location, an analysis relating to the query and to the response is prepared and sent to the members of the group.

Embodiments of the invention can include the following. In one embodiment, the analysis is sent only to members of the group that responded to the query. In another embodiment, the query is sent to the first member for approval before sending it to the group. In still another embodiment, if no responses are received at the central location in response to the query, the query is sent from the central location to a non-group member, such as a consultant, and an analysis is prepared based on a response from the non-group member.

In still another embodiment, the invention provides a method for networked consulting, comprising establishing a group comprising two or more members; receiving at a first location over a computer network, within a predetermined first time period, a plurality of first messages from members of the group; generating at least one set of queries based on at least a portion of the first messages; sending the at least one set of queries from the first location to the group; receiving at the first location over a computer network, within a predetermined second time period, a plurality of second messages responsive to at least a portion of the set of queries; preparing at least one analysis based on a query in the set and any corresponding responses; and sending the analysis from the first location to the group.

The foregoing and other objects, aspects, features, and advantages of the invention will become more apparent from the following description and from the claims

DESCRIPTION OF THE INVENTION

Figure 1:
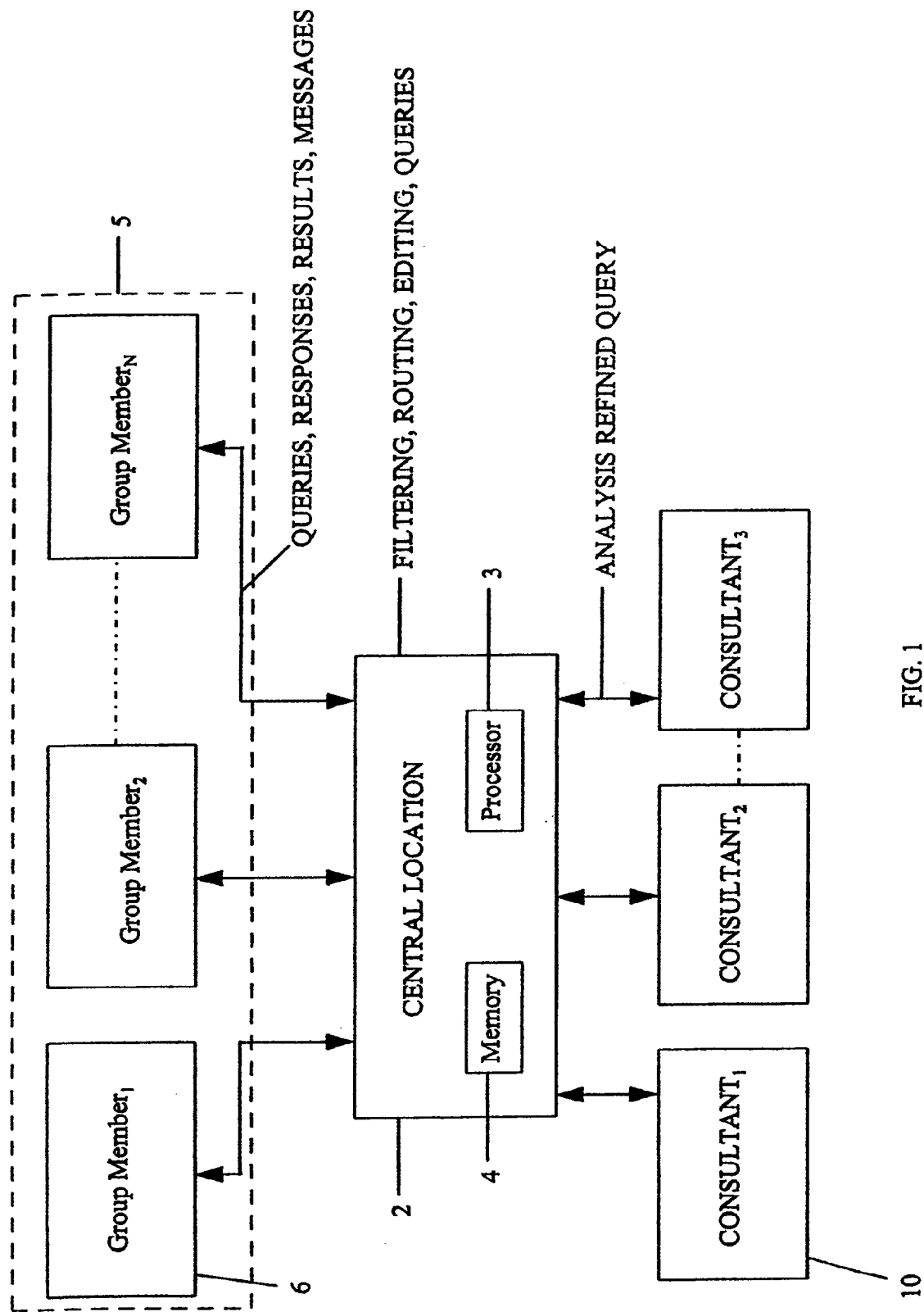
FIG. 1 is a block diagram of a networked consulting system, in accordance with one embodiment of the invention.

FIG. 1 illustrates a block diagram of a system that can implement one embodiment of the invention. Central location 2 represents, in one embodiment, a computer capable of receiving and sending communications over a network. In one embodiment of the invention, central location 2 is a computer that communicates over a wide area network. In another embodiment, central location 2 is a "virtual" location, such as a web page on the World Wide Web ("WWW") that can receive and send communications to other locations. Typically, central location 2 is a computer that comprises at least a processor 3 and a memory 4.

Group members 6 and consultants 10 are connected over a computer network, such as a wide-area computer network, so that all members and consultants communicate electronically with the central location 2. This communication can be in the form of electronic mail, access to one or more web pages, or any other electronic communication system.

An executive group 5 comprises a plurality of group members 6. The executive group 5, in one embodiment, represents a set of group members 6 having some predetermined characteristic, such as business area, executive position, size of company, yearly income, and the like. For example, an executive group 5 called "CEO" may be formed from a plurality of group members 6 that are each chief executive officers (CEOs) of a business. More than one characteristic is used, in some embodiments, to define the group. For example, an executive group 5 called "Telecom HR" may be formed from the heads of human resources at telecommunications companies having gross incomes of greater than $8 billion dollars/year.

In one embodiment, executive groups 5 are formed to provide a set of members of the business community to whom surveys, queries, and other types of information gathering are directed. Specifically, any group member 6 having a question about a particular business issue can, using the system described below, submit the question to other members of the executive group 5. However, in a preferred embodiment, the group member 6 does not submit the question directly to the members. Rather, a group member 6 submits a question, over a computer network, to the central location 2.

It should be understood that the group member 6 need not submit only a question to the central location 2. The group member 6, in one embodiment, can submit other information, such as the statement of a problem, an observation, a series of questions, and the like. Indeed, the message from a group member 6 might not contain an actual question or might contain the wrong question. That is, a group member 6 may have a problem, but might not know the question to ask that may result in answers (from other group members 6) that may help address the problem.

To ensure that the other members 6 of an executive group 5 are able to provide useful input or answers to the group member with the query or issue, the central location 2 takes the message sent from the group member and turns it into a targeted query or series of queries. This is accomplished, in a preferred embodiment, by communicating the original message over the computer network from the group member 6 to one or more consultants 10. A consultant 10 is a "live" person, typically sitting at a computer communicating over a computer network with the central location 2. The consultant 10 is trained to recognize, refine, edit, summarize, and/or rephrase questions from a group member 6 into one or more queries that are potentially answerable by other members of the executive group 5 and that may result in useful information for the group member 6 (as well as other group members 6). In addition, in one embodiment, more than one consultant 10 may participate in refining the group member's question.

In one embodiment, the central location 2 waits a certain predetermined length of time before transmitting the query to the group members 6. Thus, this permits multiple group members 6 to ask questions and have the consultant 10 refine and organize the questions into one or more surveys that are submitted to group members 6. For example, the central location 2, in one embodiment, provides a two-week interval during which group members 6 may submit questions. During this period, central location receives questions and messages from group members 6 and provides them to the one or more consultants 10 to be refined. After the two-week interval is over, the consultant 10 organizes the questions into a useful format, such as by category, and develops a set of queries that effectively summarize the questions that are received. Questions that do not fit into other categories may be saved in memory 4, but preferably are segregated into an "other" or "miscellaneous" type category in the query set.

When the consultant 10 has refined the question into one or more queries, the query is sent to each group member 6 in the executive group 5. In one embodiment, as a condition of group membership, each group member 6 is obligated to participate in answering queries sent to it from central location 2. The queries can be provided to the group members 6 from the central location 2 in several ways. In one embodiment, the query is sent as an electronic communication, such as an electronic mail message, to which the group member replies. In another embodiment, the query is provided on a web page that a group member 6 accesses. For example, as a condition of belonging to the executive group 5, a group member 6 must agree to access a particular web page at least one a month. When the group member 6 accesses that web page, one or more "refined" queries from other group members are listed there. Thus, it is seen that the central location 2 can cluster together questions that it receives from different group members 6; the invention is not limited to asking and answering one question at a time. In another embodiment, submission of queries and responses is accomplished using non-electronic communication, such as conventional mail.

As group member 6 responds to the one or more queries that it receives from central location 2, it sends its response back to central location 2. Central location 2 transmits the replies to one or more consultants 10. Consultants 10 review the results and prepare an analysis/summary of the results for each query. Typically, the type and level of analysis depends on the topic area(s) of the queries, the sophistication of the group members 6, the level (e.g., cost) of consultant service for which group members 6 have paid, and the like. When the analysis is complete, the consultant 10 transmits it to central location 2, which then transmits it to all group members 6. This transmission may be in any manner known to those skilled in the art, such as regular mail delivery, electronic communication, posting to a web page, and the like.

In one embodiment, the invention provides a level of anonymity, if desired. For example, in one embodiment, the identity of the group member 6 that submitted the question is concealed from one or more of the other group members 6 or the consultant 10. In another embodiment, the identities of one or more group members 6 providing responses are kept anonymous. In yet another embodiment, a group member 6 responding to a query (which may or may not be anonymous) from the central location 2 indicates in its response that it does not wish to conceal its identity from the group member 6 that submitted the question. In fact, the responding group member 6 may expressly indicate that it is open to receiving direct communication from the questioning group member 6. Likewise, a questioning group member 6 might indicate that it is receptive to receiving direct communications from other group members 6 in response to its question. The direct communications can occur, in some instances, even without revealing the identities of the participants.

The following examples explain how several embodiments of the invention work. It should be understood that these examples are not intended to be limiting. Those skilled in the art will recognize other types of questions and responses that are usable in connection with the invention.

With reference to FIG. 1, suppose that one of the group members 6 is having problems determining whether or not to migrate the computers that its company uses to a different operating system. The group member 6 is a member of an executive group 5 that comprises companies involved in the financial services business. That group member 6 submits the following question to the central location 2:

"Should I, as a financial services business, upgrade from operating system X to operating system Y? What are the advantages and disadvantages of doing this? How much will it cost? Who should I use to perform the upgrade?"

Central location 2 forwards this message to consultant 10, who develops a brief survey to send to members of the executive group 5 (of financial services industry members), to help find an answer to the question sent by the group member 6. The survey has the following questions:

What operating system do you use?
How long have you used it?
What operating system did you use previously?
Why did you change operating systems?
How much did it cost?
Are you planning on upgrading your system?
If so, when?
To what?
Who did you use or will you use to perform the upgrade?

The central location 2 then sends this set of queries to members 6 of the executive group 5. Note that the set of queries may have as few or as many queries as the consultant 10 deems necessary. Further, the question might be sent to other groups that a consultant 10 might deem relevant or interested in the answer.

In response, group members 6 send replies to the central location 2 that respond to the set of queries received, Central location 2 transmits these responses to consultant 10, which analyzes the results. Typically, the analysis tabulates the answers to the questions, looks for trends or particularly helpful responses, generates advice based on the responses, and the like. When the analysis is complete, the consultant 10 provides it to the central location 2, which it sends to each group member 6. In this example, based on the answers received, an analysis sent to the group 5 might read:

Question: "Should I, as a financial services business, upgrade from operating system X to operating system Y? What are the advantages and disadvantages of doing this? How much will it cost? Who should I use to perform the upgrade?"

Answer based on service results: "No, it is probably not recommended to upgrade to operating system Y at this time. Fewer than 10% of your peer group is presently using this operating system and only 5% plan to migrate to it in the future. Instead, nearly 45% of your peer group have already migrated to operating system Z and another 20% plan to do so within the next two years. The most commonly used upgrade provider is Acme Services (used by 80% of those upgrading or planning to upgrade). The average cost of this upgrade is approximately $5000 per user."

As the above example illustrates, using the system described in FIG. 1, a group member can obtain useful, immediately implementable advice, directly related to its short and/or long term needs. Moreover, because the survey results are obtained from members of peer groups, the group member 6 can determine the "best practice" or course of action for its particular business segment. This feature is also illustrated in the following example:

In this example, a group member submits a "best practices" type question to central location 2:

"What are the best practices around the organizational structure of cross-functional Internet teams to achieve maximum results?"

In response, central location 2 forwards this message to consultant 10, who develops the following survey for group members 6:

Does the Internet team co-locate during the period that they are working on a project?
Are members of the Internet team motivated or given incentives based on results achieved with the Internet team?

Do members of the Internet team have direct or indirect reporting relationships with the head of the Internet project?

As with the previous example, the central location 2 then sends this set of queries to members 6 of executive group 5.

Note that the type of executive group 5 that is formed helps to ensure the relevance of the information related to and from group members. For example, members of the Telecom HR group may have very different concerns and opinions about a particular topic, such as upgrading computer systems, than the CEO groups described above, or the financial services industry group of the example. Yet, each group can provide valuable insight to the same problem. The same question in the above example might be submitted to other groups as a way for a group member 6 of one group to ascertain whether the business world as a whole has a positive or negative view of operating system Y.

Figure 2:
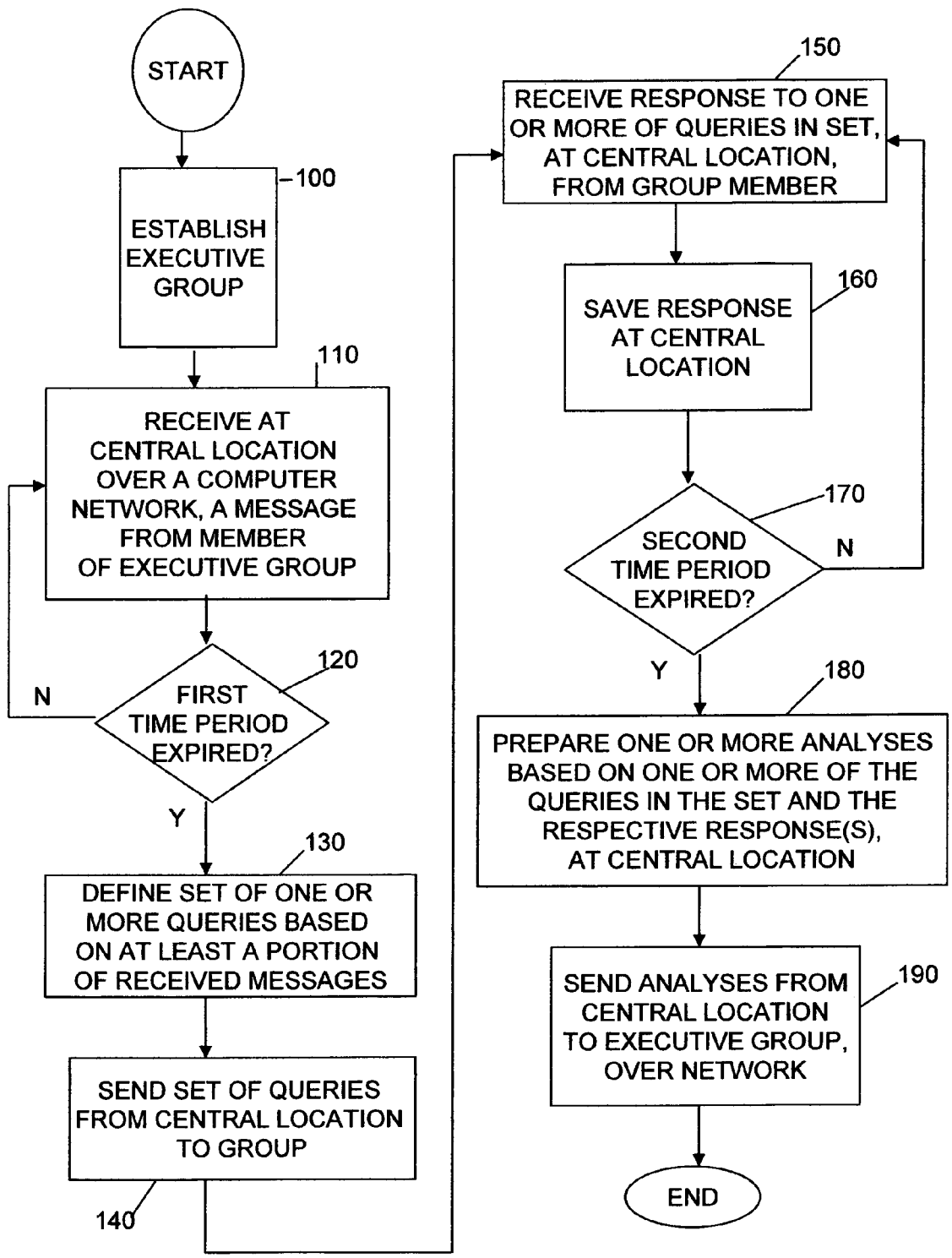
FIG. 2 is a flow chart of a method for networked consulting, in accordance with one embodiment of the invention.

FIG. 2 is a flow chart representation of a method of on-line consulting, in accordance with the present invention. After establishing the executive group (step 100), the central location receives one or more messages from group members (step 110) during a first time period (step 120). Using a first time period to accumulate questions helps ensure that a group member's question does not sit unanswered for an excessively long time. It also permits the central location to group related questions together, as described previously.

When the first time period for receiving questions is over, the central location provides the questions to a consultant so that the consultant can define a set of one or more queries based on the received messages (step 130). The central location then sends the set of queries to the group (step 140). Responses to the queries are then received at the central location (step 150) until a second time period expires (step 170). The second time period, like the first time period, helps to ensure that the group member's question can be analyzed and answered in the quickest possible time frame. However, the second time period typically is selected to give group members sufficient time to answer the queries. In one embodiment, as each response is received it is saved at the central location (step 160) until the second time period is over, as determined at step 170.

When the second time period is over, one or more consultants review the responses and prepare an analysis based on the one or more queries and the respective responses (step 180). The consultant then transmits the analysis to the central location, which then transmits it to the group (step 190). In another embodiment (not shown in FIG. 2), the central location can store the analysis for future reference by group members and/or consultants.

Variations, modifications, and other implementations of what is described herein will occur to those of ordinary skill in the art without departing from the spirit and scope of the invention as claimed. Accordingly, the invention is to be defined not by the preceding illustrative description but instead by the spirit and scope of the following claims.

What is claimed is:

1. A method for computer networked consulting comprising;
   a) establishing a predetermined group comprising more than two members;
   b) receiving at a central location over a wide-area computer network, within a predetermined first time period for receipt of first electronic messages, a first electronic message from a first member of the group;
   c) providing the first message to a consultant for defining of a first query based on the first message;
   d) electronically sending the first query from the central location to at least a portion of the predetermined group and automatically starting monitoring of a predetermined second time period upon said sending;
   e) receiving over the wide-area computer network at the central location, within said predetermined second time period, at least one electronic message from at least one second member of the group comprising a response to the first query;
   f) preparing an analysis at the central location related to the first query and the response to it;
   g) electronically sending the analysis over the wide-area computer network from the central location to the predetermined group;
   h) electronically sending the first query from the central location to at least one non-group member if no messages are received within the predetermined second time period based on said monitoring;
   i) preparing a non-group analysis related to the non-group member responses to the first query; and
   j) electronically sending the non-group analysis from the central location to at least the first member of the group.

2. The method of claim 1 wherein step (g) further comprises sending the analysis only to said first member and those members of the predetermined group that responded to the first query.

3. The method of claim 1 further comprising the step of submitting the first query from the central location to the first member for approval before sending the first query from the central location to the portion of the group.

4. The method of claim 1 wherein step (d) further comprises sending the first query to the predetermined group.

5. The method of claim 1 further comprising the steps of storing the first analysis in the central location such that it is accessible to members of the predetermined group.

6. The method of claim 1 wherein:
   (i) in step (a), said establishing a predetermined group comprises assembling a predetermined group comprising two or more members that are required to respond to queries sent to them from a central location;
   (ii) in step (d) said sending the first query from the central location to the predetermined group comprises sending the first query to said two or more members that are required to respond; and
   (iii) in step (g) said sending the analysis from the central location to the predetermined group comprises sending the analysis to said two or more members that are required to respond.

7. The method of claim 1 wherein the identity of the first member is kept anonymous.

8. The method of claim 1 wherein the identity of the second member is kept anonymous.

9. The method of claim 1 wherein the identities of the members of the predetermined group are kept anonymous.

10. A method for computer networked consulting, comprising:
    a) establishing a predetermined group comprising two or more members;
    b) receiving at a central location over a wide-area computer network, within computer network, within a predetermined first time period for receipt of first messages, a plurality of first electronic messages from members of the predetermined group;
    c) generating at least one set of queries by a consultant based on at least a portion of the first messages;

d) electronically sending the at least one set of queries from the central location to the predetermined group and automatically starting monitoring of a second predetermined time period upon said sending;

e) receiving at the central location over the wide-area computer network, within a predetermined second time period, a plurality of second electronic messages responsive to at least a portion of the set of queries;

f) preparing at least one analysis based on a query in the set and any corresponding responses;

g) electronically sending the analysis from the central location to the predetermined group;

h) electronically sending the at least one set of queries from the central location to at least one non-group member if no messages are received within the predetermined second time period based on said monitoring;

i) preparing at least one non-group analysis related to non-group member responses to a query in the set of queries and any corresponding responses; and j) electronically sending the non-group analysis from the central location to the predetermined group.

* * * * *